United States Patent [19]

Holzgrafe

[11] 4,310,855

[45] Jan. 12, 1982

[54] EFFICIENT MULTICHANNEL AUTOMATIC SETUP AND REMOTE CONTROL SYSTEM

[75] Inventor: James R. Holzgrafe, Sunnyvale, Calif.

[73] Assignee: Ampex Corporation, Redwood City, Calif.

[21] Appl. No.: 135,811

[22] Filed: Mar. 31, 1980

[51] Int. Cl.³ .............................................. H04N 5/24
[52] U.S. Cl. .................................. 358/210; 358/185
[58] Field of Search ....................... 358/210, 10, 185

[56] References Cited

U.S. PATENT DOCUMENTS

| 4,158,208 | 6/1979 | Dischert ............................... 358/10 |
| 4,167,022 | 9/1979 | Dischert et al. ..................... 358/41 |
| 4,190,863 | 2/1980 | Dischert et al. ..................... 358/210 |

*Primary Examiner*—Robert L. Richardson
*Attorney, Agent, or Firm*—George B. Almeida; Joel D. Talcott

[57] ABSTRACT

A simplified automatic error correction setup system is coupled to the remote control multiplex/demultiplex circuitry in a color camera to generate and store respective error correction control voltages for selected operating parameters during a camera setup mode, with subsequent automatic retrieval of the stored error correction control voltages during camera operation. The automatic control voltages are digitally generated from incoming error signals via a control system loop generally formed of an error selector switch, a digital register, a digital-to-analog converter (DAC) and a random access memory (RAM). The register and/or RAM data are converted to analog control voltages via the DAC for each parameter (i.e., channel) being automatically corrected, which voltages are linearly summed with the corresponding control voltages. During the automatic setup mode, the RAM contents are updated via the register for any existing errors in the specific operating parameters. The register is then disabled and the updated RAM cyclically read out continuously during the camera operating mode.

11 Claims, 4 Drawing Figures

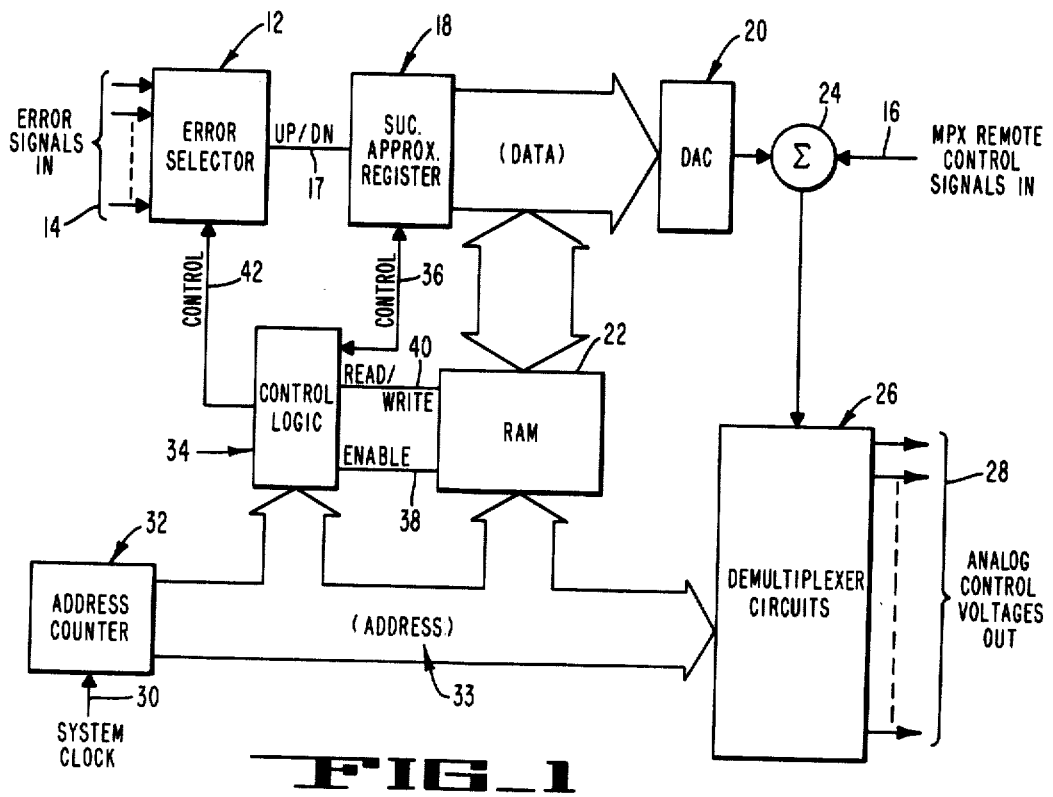
FIG_1
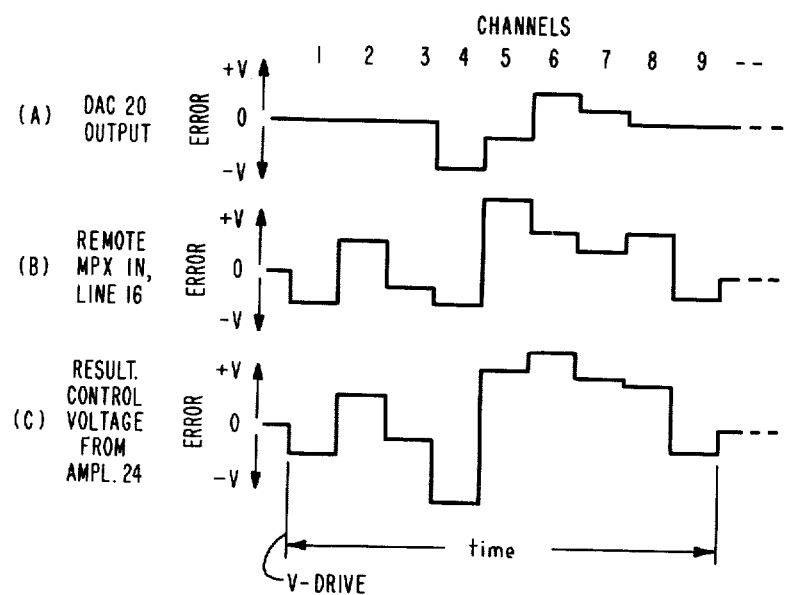
FIG_2

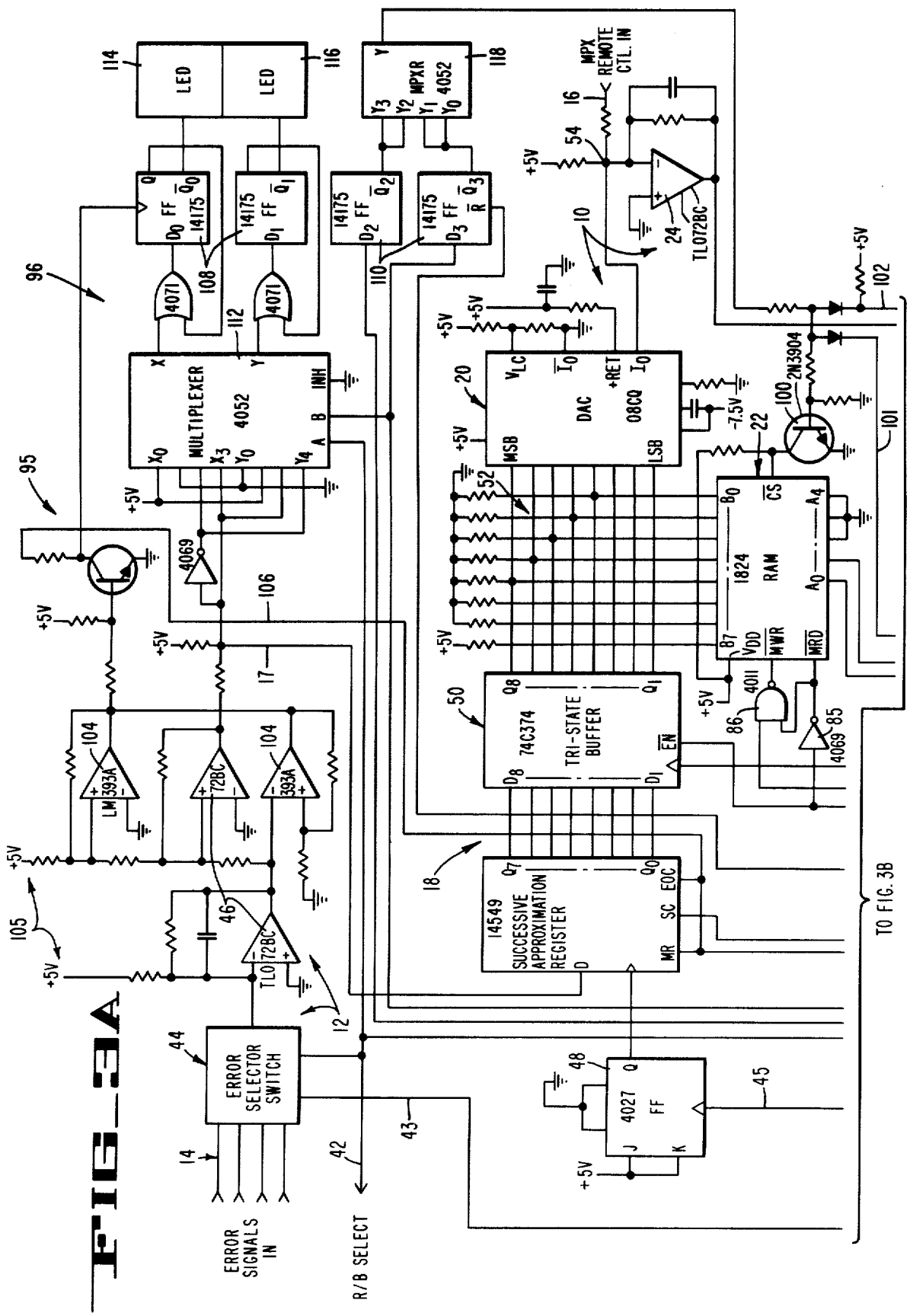

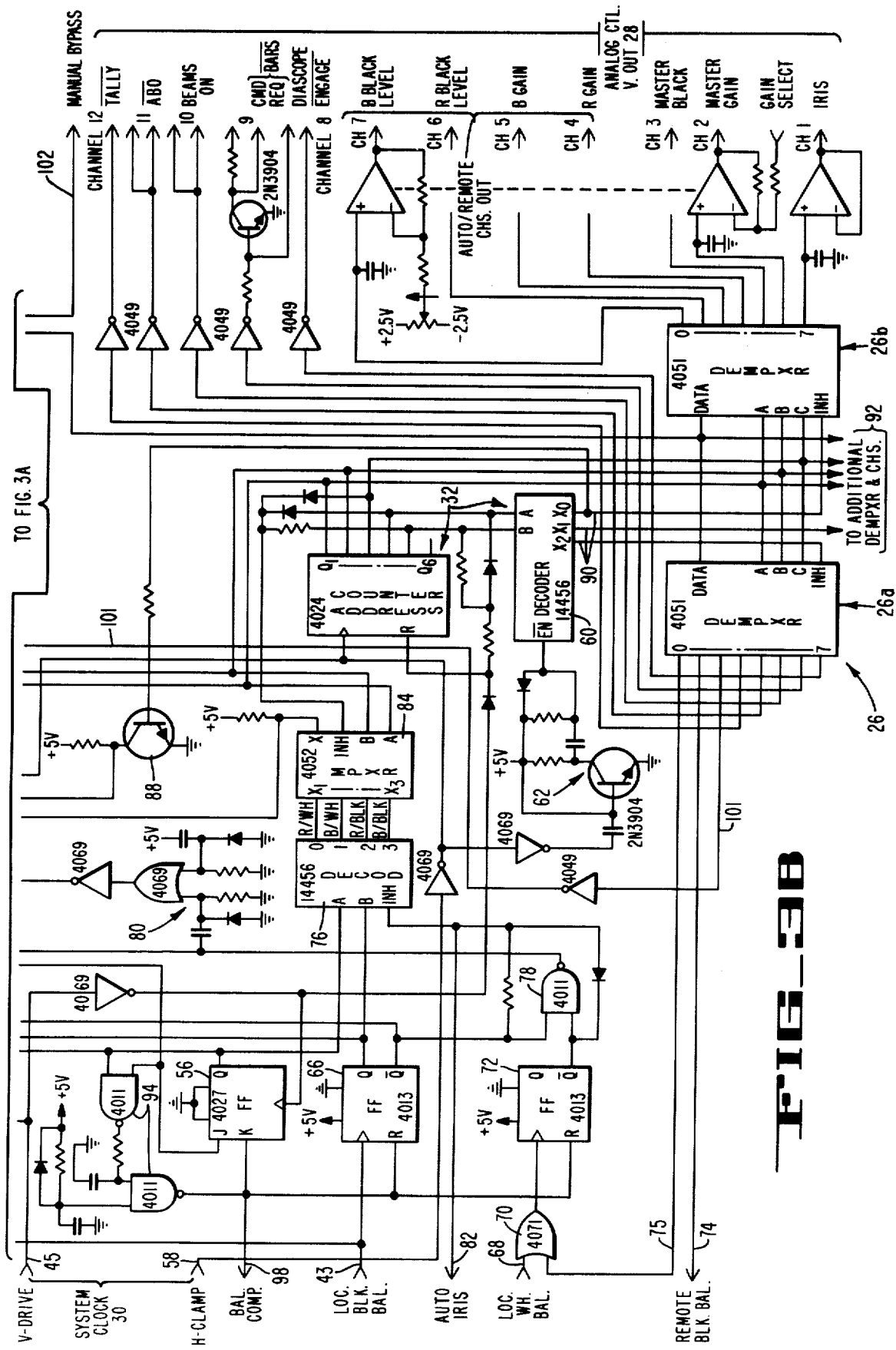

EFFICIENT MULTICHANNEL AUTOMATIC SETUP AND REMOTE CONTROL SYSTEM

BACKGROUND OF THE INVENTION

The invention is related to an automatic setup system for television cameras, and particularly to a simplified multichannel automatic setup system located in the camera head for operation with conventional multichannel analog multiplex/demultiplex remote control systems.

Television camera systems typically employ a control system within the camera head, and a multiplexed, remote control system removed from the camera head, to control the various operating parameters of the camera. Operating parameters which are controlled in this manner may include red and blue gain, the red and blue black levels, the iris setting, black stretch, beam optimization, etc. Most, or all, of these operating parameters are controlled via the remote control system, but there are specific parameters such as, for example, the red and blue gain and the red and blue black levels, etc., that also preferably may be controlled locally at the camera head. It follows that typical camera systems provide means for combining the control signals generated at the camera head with the commensurate control signals being remotely applied from the remote control system. Often, to simplify their transmission, the many remotely controlled signals are applied via a multichannel analog time-division multiplex/demultiplex system, in which case, those parameters which are both remotely controlled and locally controlled have the two control signals summed together after the remote control signal has been demultiplexed.

Prior art setup systems have typically employed one capacitor/integrator, or one counter/DAC combination for each automatically controlled operating parameter, to generate, store and retrieve respective error-correcting analog control voltages. In addition, one summing amplifier per channel is used to combine the automatic control voltages with the remote control voltages for each automatically-controlled parameter. Thus in prior art setup control means wherein a plurality, e.g., four operating parameters are automatically controlled at the camera head, then four counters, four DAC's and four summing amplifiers are required, that is, one counter, one DAC and one summing amplifier per parameter.

The most recent prior art automatic setup systems employ digital components wherein, to correct a particular error, the error signal for that parameter is applied to the counter, which supplies resulting digital data therefrom to the DAC. The counter is incremented, whereby the DAC generates an increasing or decreasing analog ramp voltage commensurate with the counter counting up or down, as directed by the nature of the error. The ramp voltage is applied back to the camera circuitry which controls the parameter in question, causing the parameter to ramp up or down accordingly. At the point where the error becomes zero for the parameter being controlled, the control loop is disabled and the counter retains the digital number corresponding to the error correction value for the parameter. In such prior art systems, a successive approximation register has also been used in place of the counter. However, in either system, a counter or register is required for each channel. Thereafter, during the operation of the camera, the counter and DAC continually maintain the corresponding static error correction voltage.

Thus, it may be seen that one counter and one DAC is required for each channel, i.e., each operating parameter which is to be automatically controlled locally at the camera head. In the typical situation of previous mention, four parameters, i.e., red and blue gains, and red and blue black levels are automatically controlled, which requires accordingly, four counters and four DAC circuits.

In addition, television cameras typically require remote control of a larger number, e.g., 12 to 64, operating parameters in addition to the few automatically controlled parameters noted above. Thus, in the case of the four parameters, it is necessary to add the control voltages generated by the remote control system, with the control voltages generated by the four counters and four DAC circuits of the automatic control system. Therefore, since each channel which employs both the automatic and remotely controlled voltages requires a summing amplifier, four of the latter also are required in the above example. It follows that three discrete or integrated circuits are required in each channel of such prior art automatic control systems.

It may be seen that prior art automatic setup control systems are somewhat cumbersome and generally require a redundant combination of components for each channel, and thus for the systems.

SUMMARY OF THE INVENTION

The invention overcomes various shortcomings of the prior art by providing a simplified and efficient automatic setup system which eliminates all redundant circuitry regardless of the number of operating parameters which are automatically controlled locally at the camera head, or of the number of channels used. The improved combination of one register or counter means, one random-access memory (RAM), one digital-to-analog converter (DAC) and one summing amplifier is all that is required to provide automatic setup and control for any number of the operating parameters and corresponding channels included in the multiplex/demultiplex system. A multiplex channel is provided for each automatically-controlled parameter, as it is the demultiplexer which distributes the data from the RAM/DAC combination. It is not, however, necessary for those channels to actually be remotely controlled. The remote multiplexer is arranged to send a fixed "zero" for any automatically controlled channel, that channel's output is due only to the automatic function.

More particularly, during the automatic setup mode of the camera, the error voltages for each operating parameter selected for automatic control are fed to a successive approximation register via an error selector switch. During the channel interval corresponding to the specific parameter being adjusted and controlled, the RAM stores the register's output in a location indicated by the address, while the DAC passes the analog equivalent to the summing amplifier and the demultiplex system. Thus, the control voltage corresponding to a respective parameter directly follows the contents of the register. The analog waveform from the DAC is linearly summed with the waveform from the remote control system and the resultant control voltage, when demultiplexed, is equal to the remotely-transmitted value for those multiplex channels whose corresponding parameters are only remotely-controlled, and to the sum of the remotely-transmitted value and the locally stored value for those multiplex channels whose corresponding parameters are selected for automatic control. In either mode, during those channel intervals wherein the parameters do not use automatic setup, the RAM and/or the DAC is disabled.

When in the camera operating mode, the register is disabled and the digital data in the RAM corresponding to the automatically-controlled channels are continuously cycled to the demultiplex system.

BRIEF DESCRIPTION OF THE DRAWINGS

FIG. 1 is a block diagram of the automatic setup system of the invention.

FIG. 2 is a chart of typical waveforms generated via the automatic and the remote control systems.

FIGS. 3A–3B are schematic diagrams of the block diagram of FIG. 1.

By way of definition, white color balance in the red or blue channels is provided when the red/blue (R/B) channel gains are adjusted, to match the R/B peak white signal levels to the green (G) channel peak white signal level. Likewise, black color balance is provided when the R/B black signal levels are adjusted to match them to the G channel black signal level. Thus, the (four) operating parameters selected herein for automatic control by way of example only, are referred to as the red and blue gains and the red and blue black levels, respectively.

Referring to FIG. 1, the error signals corresponding to the error voltage of the selected operating parameters of previous mention above, are introduced to an automatic setup system 10 and particularly to an error selector means 12 via an input bus 14. The error signals are generated via the usual error generating circuits in the camera head apparatus and comprise analog voltages indicating whether the parameter signals are in positive or negative error; i.e., too high or too low. The error selector means 12 sequentially selects the channel corresponding to the parameter whose error is being addressed, which channel corresponds in turn to the channel and parameter being addressed via a remote control voltage from a multiplexed analog remote control system (not shown) on an input line 16.

The up/down command generated by the error selector means 12, which corresponds to a too high or too low error voltage, is coupled via a line 17 to a successive approximation register 18, and thence to a digital-to-analog converter (DAC) 20 and a random access memory (RAM) 22. The DAC 20 is coupled to a summing amplifier 24, along with the analog remote control signal on the multiplexed line 16. The summation at summing amplifier 24 may be either current or voltage; it may, in fact, be one of each. For instance in the circuit of FIGS. 3A, 3B, the DAC 20 output is a current and the multiplex input on line 16 is a voltage. The resulting composite control voltage from the summing amplifier 24 is applied to a demultiplexer circuit 26 of the multiplexed analog remote control system, which in turn sequentially provides the combined automatic and remote analog control voltages on an output bus 28. The demultiplexer circuit 26 thus provides the composite control voltages for parameters selected for automatic control, as well as the remote control voltages for the additional parameters which are only controlled remotely.

Timing and sync signals are provided by system clocks indicated at 30, which drive address counter means 32. The clocks 30 provide suitable sync signals e.g., horizontal (H) and vertical (V) sync related signals, which insure that the error selector means 12, the register 18, the RAM 22, the DAC 20 and the demultiplexer circuit 26, are running at the same rate as the camera apparatus and are looking at the same channel as is the remote multiplex transmitter. The clocks 30 thus are synchronous with the clock which controls the remote control system, i.e., with the camera system H and V sync signals.

The address counter means 32 supplies the address via a main address bus 33 to the RAM 22, the demultiplexer circuit 26 and to a control logic circuit 34. The latter supplies various logic control signals via lines 36 and 38 to the register 18 and to the RAM 22 respectively, as well as a read/write command to the RAM 22 via a line 40 and a red/blue (R/B) select request to the error selector switch 12 via a line 42.

In operation, during the setup mode when the camera apparatus is not operating, the remote control system is clocked through the plurality of channels corresponding to the operating parameters which are remotely controlled. Since the automatic setup system 10 is responsive to, and thus in sync with, the system clocks 30, when the multiplex/demultiplex system addresses a channel corresponding to an operating parameter which is also to be automatically controlled locally to the camera head, the error selector means 12 also selects that channel in response to the R/B select request from the control logic circuit 34. The error signal corresponding to the error for that parameter is fed to the successive approximation register 18, which adjusts its contents in response to the nature of the error. Simultaneously, during the setup mode, the register output for that channel is applied directly to the DAC 20 and is linearly added by the summing amplifier 24 to the remote control voltage applied thereto from the line 16. The register output is also simultaneously written into the RAM 22 in response to the address on bus 33 and the write command thereto on the line 40. The RAM 22 is updated with every cycle of all of the channels, until the parameter error is zero. During the subsequent operating mode of the camera apparatus, the register 18 is disabled and the RAM 22 contents for each selected channel are read out at times corresponding to the selection times of the analogous channels of the demultiplexer.

Referring to FIG. 2, the graphs depict the analog control voltage waveforms generated on the one hand by the automatic setup system 10, and on the other by the multiplexed remote control system, as well as the resulting composite control voltage waveform which is fed to the demultiplexer circuit 26 to correct the respective parameter errors. By way of example only, nine channels corresponding to nine specific camera operating parameters are depicted, although 24 or more channels are available. Thus, FIG. 2A depicts the waveform generated by the automatic setup system 10 at the output of the DAC 20 of FIGS. 1 and 3, wherein channels 4, 5, 6 and 7 are assigned to the operating parameters selected herein for automatic control, i.e., red and blue gains, and red and blue black levels, respectively. FIG. 2B depicts the waveform generated by the multiplexed remote control system and applied to the summing amplifier 24 via line 16, wherein channels 1–3, 8, 9, etc, are assigned to other parameters, e.g., master gain, iris, beam optimization, black stretch, etc., which are only remotely controlled. Remote channels 4 through 7 however, are also assigned to red and blue gains and red and blue black levels, respectively. The FIG. 2C depicts the resultant control voltage waveform which is provided by the linear addition of the simultaneous waveforms of FIGS. 2A and 2B.

Thus, upon instigating the setup mode, at time V-drive from the system clocks 30, the address counter means 32 applies the respective address to the automatic setup system 10 as well as to the demultiplexer circuit 26, whereby channel 1 is selected. The parameter corresponding to channel 1 is being only remotely-controlled and accordingly there is no output from the DAC 20. The resulting control voltage of FIG. 2C equals the voltage of FIG. 2B. The resulting control voltage is applied via the demultiplexer circuit 26 to the control circuit (not shown) in the camera apparatus which performs the actual correction.

The address counter means 32 then generates the next two addresses for channels 2 and 3, and the respective remotely controlled voltages therefor are each fed in turn to the demultiplexer circuit 26 via the summing amplifier 24.

However, when channel 4 is addressed to correct the assigned parameter, the red gain, the automatic setup system 10 receives the error signal, generates a digital word in the register 18 corresponding to the error correction required, writes the digital word into the RAM 22 and simultaneously applies the correction voltage of channel 4, FIG. 2A, to the summing amplifier 24 via the DAC 20. This correction voltage is linearly added to the remotely-controlled voltage of FIG. 2B via the summing amplifier 24, and the resulting composite control, i.e., error correction, voltage of FIG. 2C is fed to the demultiplexer circuit 26 and thence to the error correction circuit of the camera apparatus on channel 4 of the output bus 28.

The channels 5, 6, and 7 likewise generate resulting composite control voltages as depicted in FIG. 2 in response to being addressed by the address counter means 32. Channels 8 and 9, etc., are then addressed and only the remotely-controlled voltages of each are fed to the demultiplexer circuit 26.

By way of example, each channel interval may be of the order of one horizontal, i.e., about 64 microseconds. Thus all channels are readily addressed in the time of one field, whereupon the next V-drive pulse initiates a repeat of the cycle of all channels, starting with channel 1. Alternately, the system may be permitted to cycle repeatedly through the entire sequence of channels, being always reset to channel 1 by V-drive pulses when they occur. Typically, in this mode, the last cycle will be truncated by V-drive, so that the system always starts a field on channel 1. With each cycle of the setup mode, the automatic control voltages are continuously updated until they equal the error correction voltages required to totally correct the corresponding operating parameter. At such time, the RAM 22 stores the digital data corresponding to the final control voltages for each of the (four) selected operating parameters.

Thereafter, during the operating mode of the camera the final, stored control voltage data are read cyclically from the RAM 20 as the respective channels are addressed, to continuously provide the corresponding analog correction voltages for each operating parameter during camera operation.

FIGS. 3A-3B are an exemplary schematic diagram of FIG. 1 wherein like components are similarly numbered. The error signal indicative of errors in those operating parameters selected for automatic setup control, are applied to the error selector means 12 via the input bus 14. The error selector means 12 includes a selector switch 44, which selects one channel from the plurality (e.g., four) of channels, in response to the R/B select request of previous mention, on the line 42, and a local black balance select request on a line 43 of the control logic circuit 34. The selector switch 44 is coupled to a pair of operational amplifiers 46 which define the final processing stage of the error selector means 12, and which generate an up-count or down-count command indicative of the error being positive or negative, i.e., too high or too low. The up/down command is fed via the line 17 to the data input port of the successive approximation register 18, whose clock input is coupled to V-drive of system clocks 30 via a line 45 and a J-K flip-flop 48. The register 18 is coupled to and includes a tri-state buffer 50 which, in turn, is coupled to the DAC 20 and to the RAM 22 via an 8-bit matrix 52. The analog output from the DAC 20 is fed to a junction 54 along with the remotely-controlled analog signal on the line 16. Junction 54 is coupled to the summing amplifier 24, which couples to data input ports of the demultiplexer circuit 26, and particularly to demultiplexers 26a and 26b. The latter provide the error correcting control voltages for the successive channels via the output bus 28. The (four) automatically controlled parameters red gain, blue gain, red black level and blue black level, are thus depicted herein on channels 4–7 respectively, as discussed in FIG. 2 supra. As shown on output bus 28, channels 1-3 are assigned to the iris setting, the master gain and the master black control voltages respectively, channel 8 is assigned to the diascope engage command, and so on through the remaining channels 9–12. Channels 1-3, 8-12, etc., are remotely controlled only.

Synchronization of the automatic setup system 10 with the camera apparatus, the multiplexed analog remote control system, etc., is provided via the system clocks 30, i.e., the V-drive and H-clamp signals. Thus V-drive on line 45 clocks the flip-flop 48, a JK flip-flop 56 via an inverter, and also resets the address counter means 32. The H-clamp is applied on a line 58 via an inverter and clocks the buffer 50, the address counter means 32, and enables a binary 1-of-4 decoder 60 of the address counter means via an inverter and transistor circuit 62. Transistor circuit 62 disables the decoder 60 and thus the demultiplexer circuit 26 during the transitions between channels.

In addition, the local black balance select request of previous mention is fed on the line 43 to the clock input of a D-type flip-flop 66, as well as to the selector switch 44. A local white balance select request is fed via a line 68 and an OR gate 70 to clock a D-type flip-flop 72. The other input to OR gate 70 is coupled to an output port of the demultiplexer 26a via a line 75, while another output port generates a remote black balance command which is fed back to the remote control system on a line 74.

The Q outputs of the flip-flops 56 and 66 are fed to the A and B ports respectively, of a binary to 1-of-4 decoder 76. The $\overline{Q}$ outputs of the flip-flops 66 and 72 are fed to a NAND gate 78, which is coupled to the start-conversion (SC) port of the register 18, and also to an OR gate circuit 80. The $\overline{Q}$ output of flip-flop 72 also is coupled to the inhibit input of the decoder 76, while also providing an iris on/off logic command via an output line 82.

Decoder 76 thus provides a plurality of (four) outputs corresponding to the parameters being automatically controlled; i.e., the decoder 76 sequentially generates channel select requests R/white, B/white, R/black and B/black, respectively. These select requests are fed to an analog multiplexer 84 which generates a train of pulses on its output port X, wherein the time of occurrence of successive pulse trains corresponds to channels 4, 5, 6 and 7 (in this example). The channels in turn correspond to one of the (four) inputs to the multiplexer 84. The X port is coupled to the enable port of the buffer 50, and to the memory read enable port of the RAM 22 via an inverter 85. The inverter 85 output also is coupled to a NAND gate 86, whose other input is coupled to an inhibit output from the decoder 60, further discussed below, via a transistor 88. The NAND gate 86 is coupled to the memory write enable port of the RAM 22.

The A, B and inhibit ports of the multiplexer 84 are coupled to respective Q output ports of the address counter means 32, whereby during the channel intervals when only remotely controlled channels are addressed the multiplexer 84 is inhibited, and when the automatically controlled channels (e.g., 4–7) are addressed the multiplexer generates the logic state on output X corresponding to the specific channel.

The Q output ports of the address counter means 32 are also variously coupled to the A, B and C input ports of the demultiplexers 26a, 26b and to the A0 and A1 ports of the RAM 22. The decoder 60 is coupled at its A, B input ports to two of the address counter means 32 address lines, whereby it decodes the two most significant bits of the address word and generates inhibit commands on lines 90, one of which extends to the transistor 88. The inhibit commands extend to the inhibit ports of the demultiplexers 26a, 26b, and also to any additional multiplexers as indicated at 92, to allow sequential selection of individual portions of the demultiplexer circuit 26 when a large plurality of channels are used. Given a different arrangement of multiplexer integrated circuits, the decoder 60 may be omitted and the full address word used directly to address consecutive channels.

An end of conversion (EOC) port in register 18 delivers respective commands to the master reset (MR) port of resistor 18, to the J input of the flip-flop 56, to a pair of series NAND gates 94, and to a balance-successsful check circuit 95 and a steering circuit 96 further described below. The NAND gates 94 also receive the R/B select request on line 42, and thence are coupled to the K input of the flip-flop 56 and to the reset inputs of the flip-flops 66 and 72. The NAND gates 94 also provide a balance-completed command on a line 98 extending to the white-and black-balance request generating circuitry in the camera apparatus (not shown).

The chip select (CS) port of the RAM 22 is coupled to a 5 volt source, switchable to ground by a chip-select transistor 100. The latter is coupled to an output port of the demultiplexer 26a via an inverter and a line 101, and also is coupled to a manual bypass command via a line 102. The bypass command over-rides the automatic operation of the automatic setup system 10 and shuts the system down if, for example, the system is not functioning properly.

The balance-successful check circuit 95 and steering circuit 96 provide means for informing an operator that the camera system has not successfully performed the balance function for some reason. Thus the error signal is fed from the first operational amplifier 46 to a pair of comparators 104 which are also coupled to a reference voltage source via a voltage divider, generally indicated by 105. The combined outputs of comparators 104 are coupled via the check circuit 95 and a line 106 to the EOC port of the register 18, and to the common clock input of two pairs of D-type flip-flops 108, 110. The error up/down command of the second operational amplifier 46 further is fed to a multiplexer 112, whose A, B and inhibit ports respectively are coupled to the R/B select request of the flip-flop 56, to the Q output of flip-flop 66, and to ground. The flip-flops 108, 110 are variously coupled to the multiplexer 112, and to the Q and $\overline{Q}$ outputs of the flip-flop 66, respectively. Flip-flops 108 output to light emitting detectors (LED) 114, 116, and flip-flops 110 output to a multiplexer 118. The common reset input of flip-flops 110, 108 is coupled to the OR gate circuit 80. The multiplexer 118 is coupled to the chip select transistor 100 and provides a logic level which, in effect, places the system in manual control. During a white balance operation the LED 114 indicates when a color filter must be removed from the camera, and the LED 116 indicates that a filter should be added; during a black balance operation, LED 114 indicates when an error remains in the red channel, and LED 116 indicates when an error remains in the blue channel.

The operation of the automatic setup system 10, in sync with the multiplexed remote control system, is initiated by pushbutton switches which locally apply a high logic level to either the black or white balance lines 43 or 68, respectively, via the camera head, or remotely by the multiplexed remote control system via the black or white balance request lines 74 or 75, respectively. If a white balance request is made the Q output of the flip-flop 66 and the B input of the decoder 76 stay at a low logic level, Q of flip-flop 66 stays high and Q of flip-flop 72 goes low, whereby the NAND gate 78 output goes high to provide a start conversion command to the register 18 to initiate the first cycle of the channels. The Q output of the flip-flop 56 stays low indicating the red channel is selected for comparison to the green channel. The (four) outputs of the decoder 76 are normally high, and at such time as the particular function is selected (e.g., red/white balance) the appropriate output goes low and the multiplexer 84 generates a train of pulses commensurate with the channel selected for automatic control (viz. channels 4–7 herein). The RAM 22 receives the write command when the appropriate channel (4–7) is addressed, while the digital word representing the error of the parameter for that channel is fed to the DAC 20 for conversion to an analog voltage, which is then linearly added to the remotely controlled voltage at the summing amplifier 24. The composite control voltage is fed vrom the demultiplexer circuit 26 on the corresponding channel. The RAM stores the digital word.

The cycling continues with the RAM 22 successively updating its memory until the red channel gain is balanced, i.e., until the peak white signal level matches the green peak white signal level. Then an end-of-conversion pulse is fed from the register 18 to the J input of the flip-flop 56, whose Q output goes high to select the blue channel, and the cycling is initiated again to match the blue peak white level to that of the green.

When the black balance request is made, the Q output of flip-flop 66 and the B input of the decoder 76 go high, $\overline{Q}$ of flip-flop 66 goes low, $\overline{Q}$ of flip-flop 72 stays high, whereby the start conversion command is again fed to the register 18. The Q output of flip-flop 56 is low indicating the red channel black signal level is selected for comparison with the green channel. After red black balance is achieved, the end conversion pulse again initiates selection of the blue channel to black balance the latter.

Throughout the setup mode, the automatic setup system 10 is kept synchronous with the multiplexed remote control system and the camera apparatus via the system clocks 30, i.e., the V-drive and H-clamp sync signals. A cycle through the channels is initiated with channel 1 at time V-drive on line 45. The H-clamp sync initiates the time interval of essentially one horizontal line per channel.

Upon completion of the setup mode during which the RAM 22 is loaded with the final error correction values for the R/B gain and the R/B black levels, the camera apparatus is ready for on-air operation. The tri-state buffer 50, and thus the successive approximation register 18, is disabled and the RAM 22 is placed in the read mode. During camera apparatus operation, the control voltages corresponding to the parameters selected for automatic correction, are read from the RAM 22 each time their respective channels (eg, channels 4-7) are addressed by the address counter means 32. As during the setup mode, the V-drive sync initiates each cycle of the channels, and H-clamp determines the channel time interval.

The balance-successful check circuit 95 waits until the EOC pulse is supplied from the register 18. If, at that time, a residual error is indicated by comparators 104, a clock pulse is supplied to flip-flops 108,110. The residual error is generated by the comparators by comparing the error voltages with the reference voltage via the divider means 105. Steering circuit 96 determines, during a white balance whether the light is too reddish or too blueish, and during a black balance, whether the error is in the red channel or the blue channel. The error status is then applied to LEDS 114 or 116, as appropriate, when the balance-successful check circuit 95 clocks the flip-flops 108. Simultaneously, flip flops 110 determine whether the system is attempting to white balance or black balance when the residual error is detected, and cause the multiplexer 118 to de-select the RAM 22 through the chip-select transistor 100 during the time corresponding to selection of the two gain or black level channels, as appropriate. OR gate circuit 80 causes the flip-flops 108 and 110 to reset to normal upon initiation of a second balance attempt as well as upon initial application of power to the circuit.

Various alternative implementations are contemplated within the invention combination. Thus the decoder 60 may be omitted when the separate demultiplexers 26a, 26b, etc., are replaced by a single integrated circuit configuration. Likewise, the tri-state buffer 50 may be eliminated and its function included within the register 18 proper. The register 18 also may be replaced by, for example, an up/down counter, or any device which generates a digital word appropriate to the correction of the error voltage with which it is presented. Further, any portion of the circuitry may be implemented as desired by the particular application, with discrete circuits, combinations of small-scale integrated circuits, or single large-scale integrated circuits. In all such cases, the circuit of description herein provides a significant reduction in the amount of circuitry required compared to prior implementations.

What is claimed is:

1. An automatic setup system for the automatic local control of selected camera operating parameters of a camera apparatus in conjunction with a multiplexed remote control system which includes demultiplexer means, wherein the parameters exhibit error voltages, wherein each parameter is assigned a respective channel, and wherein the selected operating parameters may be both automatically and remotely controlled via the demultiplexer means and respective channels to correct the errors thereof, the combination comprising;
   digital means including a selected memory for retrievably storing digital data representing the error correction required for each selected operating parameter;
   digital-to-analog converter means coupled to the digital means and memory for selectively generating a local analog control voltage commensurate with the automatic error correction for each selected operating parameter;
   analog summing means coupled at its inputs to the converter means and to the multiplexed remote control system and at its output to the demultiplexer means, to sum the respective analog remote and local control voltages therefrom to provide a resulting composite control voltage for correcting the error of each parameter; and
   control means integral with the camera apparatus coupled to the digital means and memory, and to the demultiplexer means, to synchronously select the channels and thus the respective operating parameters.

2. The system of claim 1 further including;
   selector means coupled to the error voltages for sequentially selecting each error voltage and for generating up/down commands indicative of same;
   counter means coupled to the selector means for temporarily generating the digital data representing the error correction for each channel; and
   wherein the selected memory includes a random access memory, and the digital-to-analog converter means and the random access memory simultaneously receive the digital data from the counter means.

3. The system of claim 2 wherein the control means includes;
   system vertical and horizontal sync related clocks;
   address counter means responsive to the clocks for generating selected addresses for successive channels and thus parameters; and
   control logic means coupled to the vertical sync related clock and to the address counter means for successively cycling the selected channels in sync with the system clocks.

4. The system of claim 3 further including;
   setup mode inputs and operating mode inputs coupled to the control logic means for initiating the setup mode and the operating mode respectively;
   wherein the random access memory continuously updates the digital data therein with new digital data from the counter means during the setup mode, and continuously reads out the updated stored digital data during the camera operating mode.

5. The system of claim 4 further including;
   demultiplexer means coupled to the summing means and responsive to the control means to pass the composite control voltages, as well as the control voltages from only the multiplexed remote control system, received from the summing means.

6. The system of claim 5 wherein;

the counter comprises a successive approximation register coupled to the selector means, and a buffer coupled to the register and responsive to the control logic means to selectively pass the digital data.

7. The system of claim 6 wherein;

the counter means comprises, an up/down counter coupled to the selector means and responsive to the control logic means.

8. The system of claim 6 wherein;

the selector means includes a selector switch coupled to the error voltages and responsive to the setup mode inputs, and comparator means for detecting if the error voltage is too high or too low with respect to a reference; and wherein the register is coupled to the comparator means and responsive to the control logic means.

9. The system of claim 8 wherein;

the control logic means includes a series of flip-flops responsive to the vertical sync related clock and to the setup mode inputs to initiate the conversion process in the register; and decoder/multiplexer means responsive the series of flip-flops and to the address counter means for selectively directing the random access memory to write during the setup mode and to read during the operating mode.

10. The system of claim 9 further including;

system divider means for providing a reference voltage; and operation check means coupled to the selector means and to the control logic means for comparing the error voltages with the reference voltage and for generating a system shut-down signal indicative of unsuccessful system operation.

11. The system of claim 10 wherein the system operation check means includes;

comparator means for comparing the error voltages with the reference voltage;

steering circuit means operatively coupled to the comparator means and responsive to the control logic means to generate status signals indicative of improper white or black balance conditions; and indicator means coupled to the status signals for indicating the nature of the system status.

* * * * *